(12) United States Patent
Agrawal (10) Patent No.: US 12,041,175 B2
(45) Date of Patent: *Jul. 16, 2024

(54) ELECTRONIC SYSTEM FOR RESOURCE ORIGINATION TRACKING

(71) Applicant: BANK OF AMERICA CORPORATION, Charlotte, NC (US)

(72) Inventor: Shilpoo Agrawal, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,182

(22) Filed: Sep. 26, 2023

(65) Prior Publication Data
US 2024/0022426 A1  Jan. 18, 2024

Related U.S. Application Data

(63) Continuation of application No. 17/376,980, filed on Jul. 15, 2021, now Pat. No. 11,811,944.

(51) Int. Cl.
*H04L 9/32* (2006.01)
*G06N 20/00* (2019.01)
*H04L 9/00* (2022.01)

(52) U.S. Cl.
CPC .......... *H04L 9/3236* (2013.01); *G06N 20/00* (2019.01); *H04L 9/50* (2022.05)

(58) Field of Classification Search
CPC ..... H04L 9/3236; H04L 9/50; H04L 2209/56; G06N 20/00
See application file for complete search history.

(56) References Cited

U.S. PATENT DOCUMENTS

| | | | |
|---|---|---|---|
| 7,711,647 B2 | 5/2010 | Gunaseelan et al. |
| 9,875,510 B1 | 1/2018 | Kasper |
| 10,140,470 B2 | 11/2018 | Kurian et al. |
| 10,417,217 B2 | 9/2019 | Pierce et al. |
| 10,574,464 B2 | 2/2020 | Lancashire et al. |
| 10,972,279 B2 | 4/2021 | Sethi et al. |
| 11,023,455 B2 | 6/2021 | Qiu et al. |
| 11,042,871 B2 | 6/2021 | Snow |
| 11,075,891 B1 | 7/2021 | Long et al. |
| 11,087,214 B2 | 8/2021 | Katz et al. |

(Continued)

*Primary Examiner* — Izunna Okeke
(74) *Attorney, Agent, or Firm* — Moore & Van Allen PLLC; Gabrielle M. Carlini (57) ABSTRACT

Embodiments of the invention relate to systems, methods, and computer program products for resource origination tracking, the invention including: electronically receiving, from a first user device associated with a first user, a digital resource and a set of distribution rules associated with the digital resource; creating an NFT associated with the digital resource; predicting, via a machine learning engine, a value of the NFT; electronically receiving, from a second user device associated with a second user, a request to complete a resource transfer; transferring ownership of the NFT associated with the digital resource from the current owner to the second user; and transmitting, to a managing entity system, instructions to transfer, from an account associated with the second user, a first amount of financial resources to an account associated with the current owner and a second amount of financial resources to an account associated with the first user.

18 Claims, 5 Drawing Sheets

(56) References Cited

U.S. PATENT DOCUMENTS

| | | |
|---|---|---|
| 11,093,558 B2 | 8/2021 | Androulaki et al. |
| 2016/0283920 A1 | 9/2016 | Fisher et al. |
| 2016/0292672 A1 | 10/2016 | Fay et al. |
| 2017/0140408 A1 | 5/2017 | Wuehler |
| 2019/0236559 A1 | 8/2019 | Padmanabhan |
| 2020/0193516 A9 | 6/2020 | De Jong et al. |
| 2020/0328890 A1 | 10/2020 | Connor |
| 2021/0097508 A1 | 4/2021 | Papanikolas |
| 2021/0133700 A1 | 5/2021 | Williams et al. |
| 2021/0150626 A1 | 5/2021 | Robotham |
| 2021/0256070 A1* | 8/2021 | Tran .................. G06F 16/90332 |
| 2021/0409489 A1* | 12/2021 | Speasl .................. H04L 63/123 |

* cited by examiner

ELECTRONIC SYSTEM FOR RESOURCE ORIGINATION TRACKING

CROSS-REFERENCE TO RELATED APPLICATION(S)

This application is a continuation application of and claims priority to U.S. patent application Ser. No. 17/376,980 filed on Jul. 15, 2021, and of the same title; the contents of which are also incorporated herein by reference.

BACKGROUND

A growing trend for owners and creators of digital resources such as music, art, books, movies, and the like is the creation of non-fungible tokens, commonly referred to as NFTs, which are unique digital identifiers stored on a distributed ledger. An NFT may be used to attribute ownership and certify authenticity for the digital resource and may be bought, sold, gifted, traded, or otherwise transferred from one owner to another. When an NFT is transferred to a new owner, the original owner may wish to maintain some control over the usage and distribution of the digital resource, as well as receive some portion of the sale price of any subsequent transfers of ownership. As such, a need exists for a system which allows digital resource owners to create, store, and manage the distribution of non-fungible tokens associated with their digital resources.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the invention relate to systems, methods, and computer program products for resource origination tracking, the invention including: electronically receiving, from a first user device associated with a first user, a digital resource and a set of distribution rules associated with the digital resource; creating an NFT associated with the digital resource; predicting, via a machine learning engine, a value of the NFT; electronically receiving, from a second user device associated with a second user, a request to complete a resource transfer, where the request includes an identification of the digital resource and an identification of a current owner of the NFT associated with the digital resource; transferring ownership of the NFT associated with the digital resource from the current owner to the second user; and transmitting, to a managing entity system, instructions to transfer, from an account associated with the second user, a first amount of financial resources to an account associated with the current owner and a second amount of financial resources to an account associated with the first user, where the combination of the first amount and the second amount is equal to the value of the NFT.

In some embodiments, the invention further includes storing the NFT on a distributed ledger.

In some embodiments, the set of distribution rules includes a predetermined percentage of the value of the NFT, and the second amount of financial resources transferred to the account associated with the first user includes the predetermined percentage of the value of the NFT.

In some embodiments, the set of distribution rules includes a transfer limitation of a number of times that ownership of the NFT may be transferred to a new user.

In some embodiments, the invention further includes determining that the resource transfer will not cause the number of transfers of ownership of the NFT to exceed the transfer limitation.

In some embodiments, predicting, via the machine learning engine, the value of the NFT includes applying one or more machine learning algorithms to a plurality of historical data.

In some embodiments, predicting, via the machine learning engine, the value of the NFT further includes calculating a level of similarity between the NFT and a plurality of other NFTs comprised in the historical data.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" or "managing entity" as used herein may refer to any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself.

"Entity system" or "managing entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"User" as used herein may refer to an individual associated with an entity. As such, in some embodiments, the user may be an individual having past relationships, current relationships or potential future relationships with an entity. In some embodiments, a user may be an employee (e.g., an associate, a manager, an administrator, or the like) of the entity or enterprises affiliated with the entity, capable of operating the systems described herein. In some instances, a "user" is an individual who has a relationship with the entity, such as a customer or a prospective customer. In other embodiments, a user may be a system performing one or more tasks described herein. "Group" as used herein may refer to any plurality of users as defined herein that have collective oversight into one or more accounts or resource instruments associated with said accounts. In some instances, a "group" is a plurality of individuals selected by a user to be granted access to the features and functions of the system claimed herein. In some instances, a "group" consists of members of an organization or entity of which a user is also associated. A "group member" may be any one individual associated with a group. Members of a group may all have equal access and insight into an account and/or resource instrument or may be granted varying levels of permission according to a user associated with said account or resource instrument.

Accordingly, as used herein the term "user device" or "mobile device" may refer to mobile phones, personal computing devices, tablet computers, wearable devices, and/or any portable electronic device capable of receiving and/or storing data therein.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, a "resource" may generally refer to objects, products, devices, goods, commodities, services, and the like, and/or the ability and opportunity to access and use the same. Some exemplary implementations herein contemplate a market value of a property held by a user, including property that is stored and/or maintained by a third-party entity. For purposes of this invention, a resource is typically stored in a resource repository—a storage location where one or more resources are organized, stored, and retrieved electronically using a computing device.

As used herein, a "resource transfer" or "transaction" may refer to any transaction, activities, or communication between one or more entities, or between the user and the one or more entities. A resource transfer may refer to any distribution of resources such as, but not limited to, a payment, processing of funds, purchase of goods or services, a return of goods or services, a payment transaction, a credit transaction, or other interactions involving a user's resource or account. In the context of an entity such as a financial institution, a resource transfer may refer to one or more of: a sale of goods and/or services, a user accessing their e-wallet, or any other interaction involving the user and/or the user's device that invokes or is detectable by the financial institution. In some embodiments, the user may authorize a resource transfer using at least a payment instrument (credit cards, debit cards, checks, digital wallets, currency, loyalty points), and/or payment credentials (account numbers, payment instrument identifiers). Unless specifically limited by the context, a "resource transfer" a "transaction", "transaction event" or "point of transaction event" may refer to any activity between a user, a merchant, an entity, or any combination thereof. In some embodiments, a resource transfer or transaction may refer to financial transactions involving direct or indirect movement of funds through traditional paper transaction processing systems (i.e. paper check processing) or through electronic transaction processing systems.

The system described herein allows the owner of one or more digital resources to create, store, and manage non-fungible tokens (NFTs) associated with said resources. The system allows a resource owner to set custom distribution rules for each NFT, providing the owner with the ability to control which users the NFT can be sold or transferred to. Resource owners may also either prevent subsequent "resales" of the NFT or set a custom percentage of each subsequent resale payment to receive. Furthermore, the system utilizes a machine learning engine to continuously update an expected value of an NFT based on historical NFT transfer data. This functionality allows both resource owners and potential NFT buyers to monitor the value of an NFT over time, as well as compare multiple NFTs available for purchase in an online resource "library" hosted on an application installed on a user device.

Figure 1:
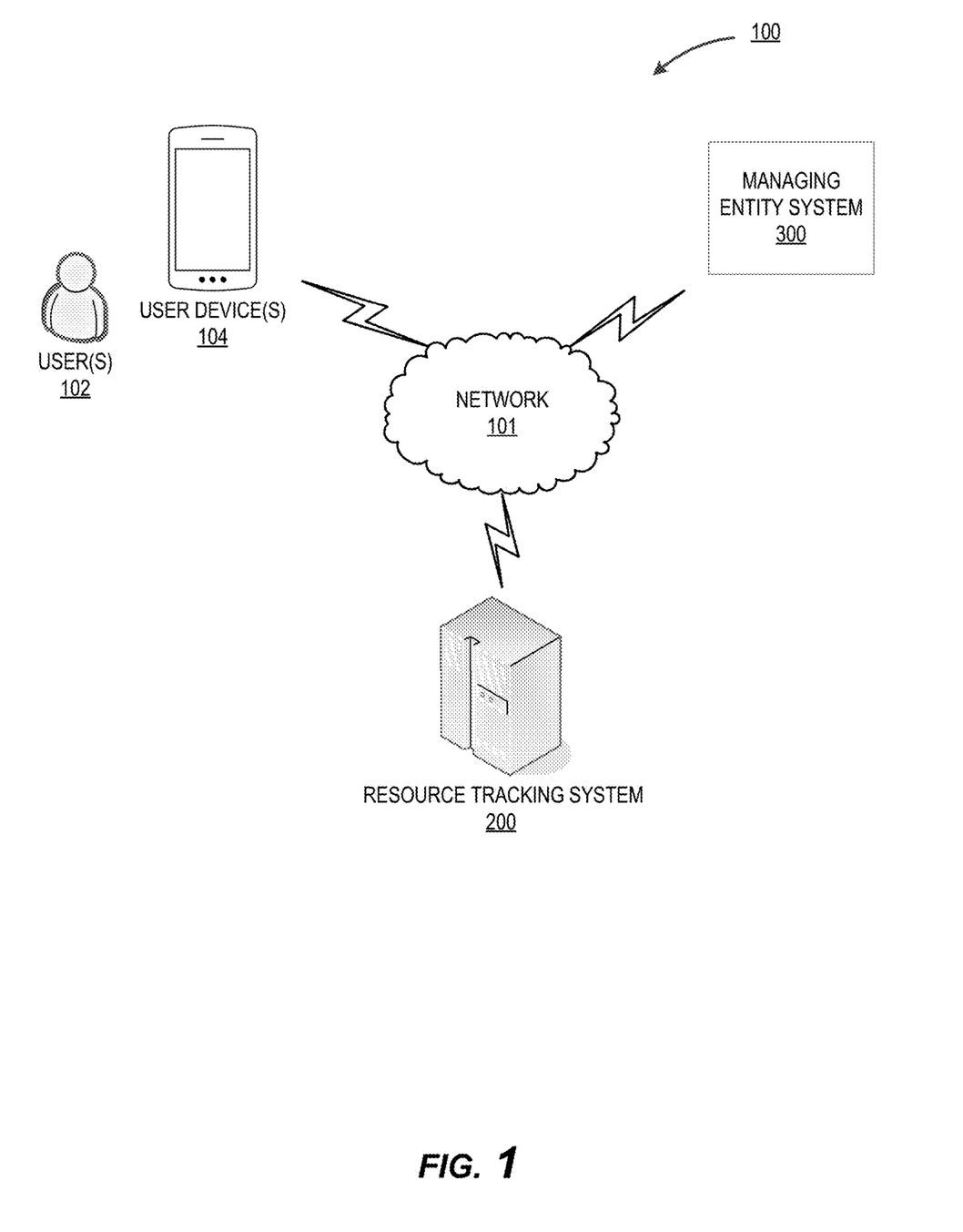
FIG. 1 illustrates an operating environment for the resource tracking system, in accordance with one embodiment of the present disclosure.

FIG. 1 illustrates an operating environment 100 for the resource tracking system, in accordance with one embodiment of the present disclosure. As illustrated, the operating environment 100 may comprise a plurality of users 102 and/or a plurality of user devices 104 in operative communication with the resource tracking system 200 and/or one or more managing entity system(s) 300. The operative communication may occur via a network 101 as depicted, or in some embodiments the user 102 may be physically present at a location associated with the resource tracking system, such as a computer terminal. The operating environment may also include other systems/devices not illustrated herein and connected via a network 101. As such, the users 102 may request, authorize, and complete resource transfers by establishing operative communication channels between a plurality of user devices 104 associated with each of the users 102, the managing entity system(s) 300, and the resource tracking system 200 via a wireless network 101. In some embodiments, the user 102 may use an associated user device 104 to complete a resource transfer by interfacing directly with the resource tracking system 200, which may then establish operative communication with the managing entity system(s) 300 and another user device 104 via a wireless network in order to execute the resource transfer.

Typically, the resource tracking system 200 and the plurality of user devices 104 are in operative communication with the managing entity system 300 via the network 101, which may be the internet, an intranet or the like. In FIG. 1, the network 101 may include a local area network (LAN), a wide area network (WAN), a global area network (GAN), and/or near field communication (NFC) network. The network 101 may provide for wireline, wireless, or a combination of wireline and wireless communication between devices in the network. In some embodiments, the network 101 includes the Internet. In some embodiments, the network 101 may include a wireless telephone network. Furthermore, the network 101 may comprise wireless communication networks to establish wireless communication channels such as a contactless communication channel and a near field communication (NFC) channel (for example, in the instances where communication channels are established between a plurality of user devices 104). In this regard, the wireless communication channel may further comprise near field communication (NFC), communication via radio waves, communication through the internet, communication via electromagnetic waves and the like.

The user device(s) 104 may comprise a mobile communication device, such as a cellular telecommunications device (i.e., a smart phone or mobile phone), a computing device such as a laptop computer, a personal digital assistant (PDA), a mobile internet accessing device, or other mobile device including, but not limited to portable digital assistants (PDAs), pagers, mobile televisions, entertainment devices, laptop computers, cameras, video recorders, audio/video player, radio, GPS devices, any combination of the aforementioned, or the like. The user device(s) are described in greater detail with respect to FIG. 3.

The managing entity system 300 may comprise a communication module and memory not illustrated and may be configured to establish operative communication channels with the resource tracking system 200 and/or the plurality of user devices 104 via a network 101. The managing entity system 300 may comprise a user data repository which stores user account data. This data may be used by the managing entity to facilitate resource transfers between the plurality of users 102 and associated user devices 104. In some embodiments, the managing entity system is in operative communication with the resource tracking system 200 via a private communication channel. The private communication channel may be via a network 101 or the resource tracking system 200 may be fully integrated within the managing entity system 300.

As will be discussed in greater detail in FIG. 4, the managing entity system 300 may communicate with the resource tracking system 200 in order to receive transfer authorization obtained from one or more of the plurality of users 102 by the resource tracking system 200. In some embodiments, the managing entity may utilize the features and functions of the resource tracking system 200 to obtain approval to execute resource transfers initiated by the user 102. The managing entity may also utilize the features and functions of the resource tracking system 200 to receive instructions relating to one or more actions to be taken with respect to a user account after execution of a resource transfer.

Figure 2:
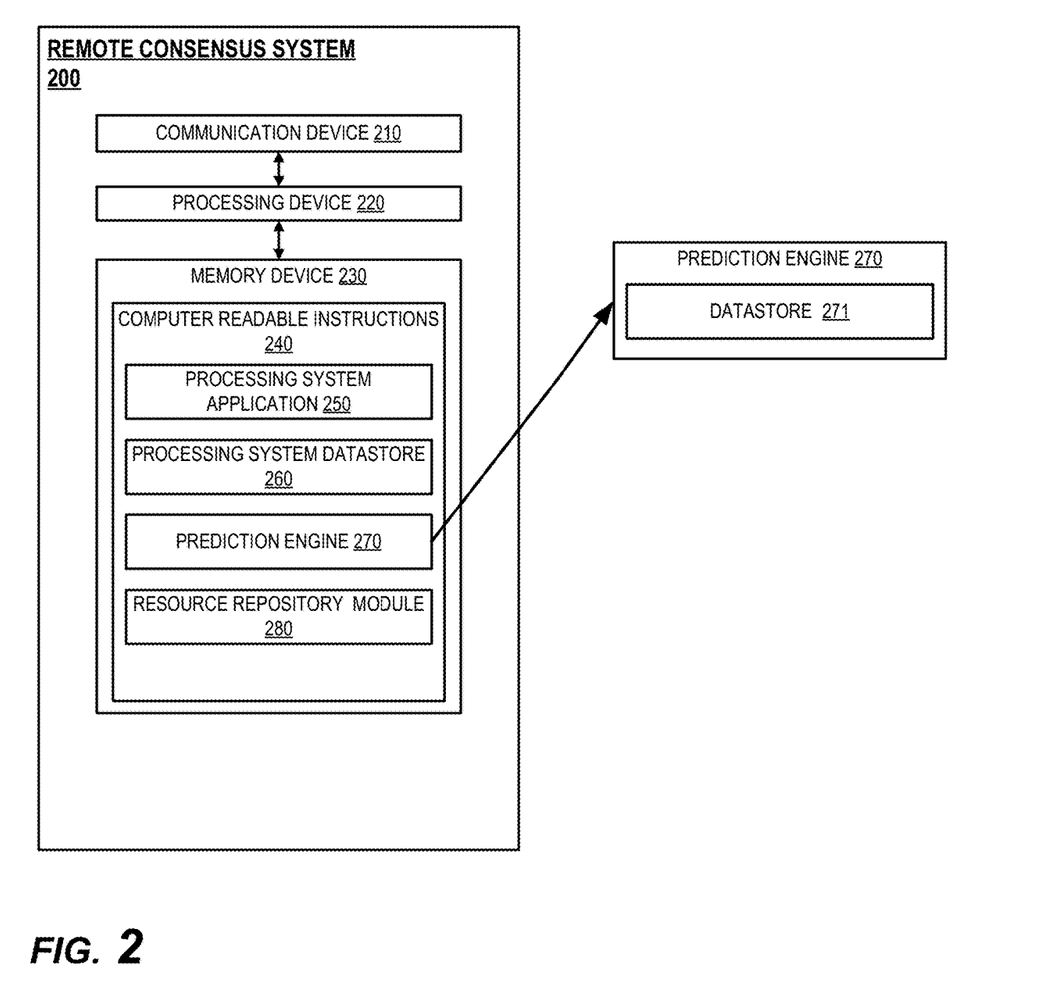
FIG. 2 is a block diagram illustrating the resource tracking system, in accordance with one embodiment of the present disclosure.

FIG. 2 illustrates a block diagram of the resource tracking system 200 associated with the operating environment 100, in accordance with embodiments of the present invention. As illustrated in FIG. 2, the resource tracking system 200 may include a communication device 210, a processing device 220, and a memory device 230 having a prediction engine 270, a resource repository module 280, a processing system application 250 and a processing system datastore 260 stored therein. As shown, the processing device 220 is operatively connected to and is configured to control and cause the communication device 210 and the memory device 230 to perform one or more functions. In some embodiments, the resource repository module 280, the prediction engine 270 and/or the processing system application 250 comprise computer readable instructions 240 that when executed by the processing device 220 cause the processing device 220 to perform one or more functions and/or transmit control instructions to the managing entity system 300, the user device(s) 104, and/or the communication device 210. It will be understood that the resource repository module 280, the prediction engine 270 and/or the processing system application 250 may be executable to initiate, perform, complete, and/or facilitate one or more portions of any embodiments described and/or contemplated herein. The resource repository module 280 may comprise executable instructions associated with storage and access of resources, as well as decisioning and logic related to resource repository actions including the creation of non-fungible tokens (NFTs), and may be embodied within the processing system application 250 in some instances. The features and functions of the resource repository module 280 are discussed in greater detail with respect to FIG. 4. The resource tracking system 200 may be owned by, operated by and/or affiliated with the same managing entity that owns or operates the managing entity system 300. In some embodiments, the resource tracking system 200 is fully integrated within the managing entity system 300.

The prediction engine 270 may further comprise a datastore 271. The datastore 271 may store instructions and/or data that may cause or enable the resource tracking system 200 to receive, store, and/or analyze data received by the managing entity system 300, the user device(s) 104, and/or other third party systems. The datastore may receive and store data and/or metadata to determine and/or update resource values as is discussed in greater detail with regard to FIG. 4. The prediction engine 270 may also store instructions and/or data that cause or enable the resource tracking system 200 to determine, in real-time and based on received information, a value of a resource or a non-fungible token (NFT) associated with a resource stored in a resource repository of the resource repository module 280.

The prediction engine 270 may receive data from a plurality of sources and apply one or more machine learning algorithms to said data. Various machine learning algorithms may be used without departing from the invention, such as supervised learning algorithms, unsupervised learning algorithms, regression algorithms (e.g., linear regression, logistic regression, and the like), instance based algorithms (e.g., learning vector quantization, locally weighted learning, and the like), regularization algorithms (e.g., ridge regression, least-angle regression, and the like), decision tree algorithms, Bayesian algorithms, clustering algorithms, artificial neural network algorithms, and the like. Additional or alternative machine learning algorithms may be used without departing from the invention.

Figure 4:
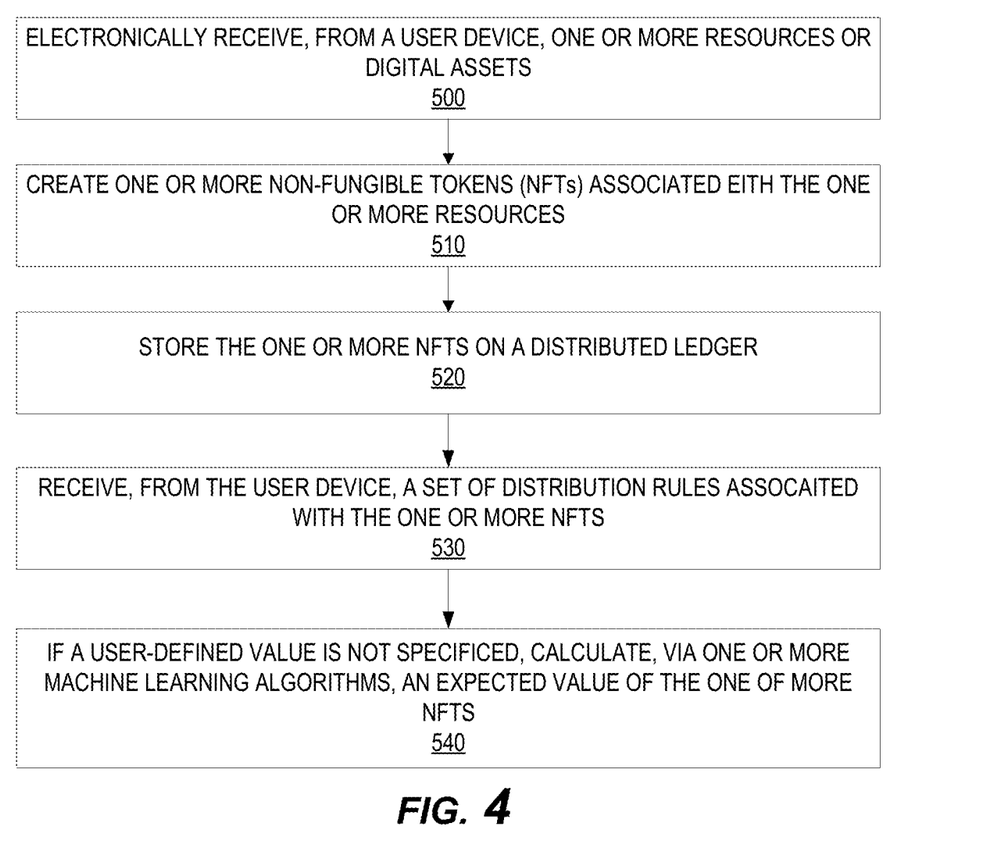
FIG. 4 is a flow diagram illustrating a process using the resource tracking system, in accordance with one embodiment of the present disclosure.

The prediction engine 270 may utilize the datastore 271 and said machine learning algorithms to link two or more prediction factors (e.g. data associated with historical transfers of other resources or associated NFTs (e.g. amounts, frequencies, associated third-party users or entities, details of "resells" or subsequent transfers, and/or the like), a similarity score between resources or associated NFTs (i.e. an evaluation of resource type, resource content, resource author/owner, resource marketplace supply and/or demand, and/or the like), and/or other associated data (e.g. geographic data, time/date information, user information, and/or the like) to identify one or more patterns or sequences that may directly and/or indirectly aid in predicting a value of a resource at a given time is discussed in greater detail with regards to FIG. 4. In some embodiments, the prediction engine 270 may apply machine learning algorithms in an iterative manner, in order to predict future conditions which may affect the value of a resource. For example, the prediction engine 270 may predict, based on data associated with resources with a high similarity score, a particular entity or user which may request to purchase a particular NFT. The results of said prediction may be used in turn to predict a value of the NFT.

The communication device 210 may generally include a modem, server, transceiver, and/or other devices for communicating with other devices on the network 101. The communication device 210 may be a communication interface having one or more communication devices configured to communicate with one or more other devices on the network 101, such as the plurality of user devices 104, the managing entity system 300 and/or other processing systems, data systems, and the like.

Additionally, referring to the resource tracking system 200 illustrated in FIG. 2, the processing device 220 may generally refer to a device or combination of devices having circuitry used for implementing the communication and/or logic functions of the data obfuscation system 200. For example, the processing device 220 may include a control unit, a digital signal processor device, a microprocessor device, and various analog-to-digital converters, digital-to-analog converters, and other support circuits and/or combinations of the foregoing. Control and signal processing functions of the data obfuscation system 200 may be allocated between these processing devices according to their respective capabilities. The processing device 220 may further include functionality to operate one or more software programs based on computer-executable program code 240 thereof, which may be stored in a memory device 230, such as the processing system application 250 and the prediction engine 270. As the phrase is used herein, a processing device may be "configured to" perform a certain function in a variety of ways, including, for example, by having one or more general-purpose circuits perform the function by executing particular computer-executable program code embodied in computer-readable medium, and/or by having one or more application-specific circuits perform the function. The processing device 220 may be configured to use the network communication interface of the communication device 210 to transmit and/or receive data and/or commands to and/or from the other devices/systems connected to the network 101.

The memory device 250 within the resource tracking system 200 may generally refer to a device or combination of devices that store one or more forms of computer-readable media for storing data and/or computer-executable program code/instructions. For example, the memory device 250 may include any computer memory that provides an actual or virtual space to temporarily or permanently store data and/or commands provided to the processing device 220 when it carries out its functions described herein.

Figure 3:
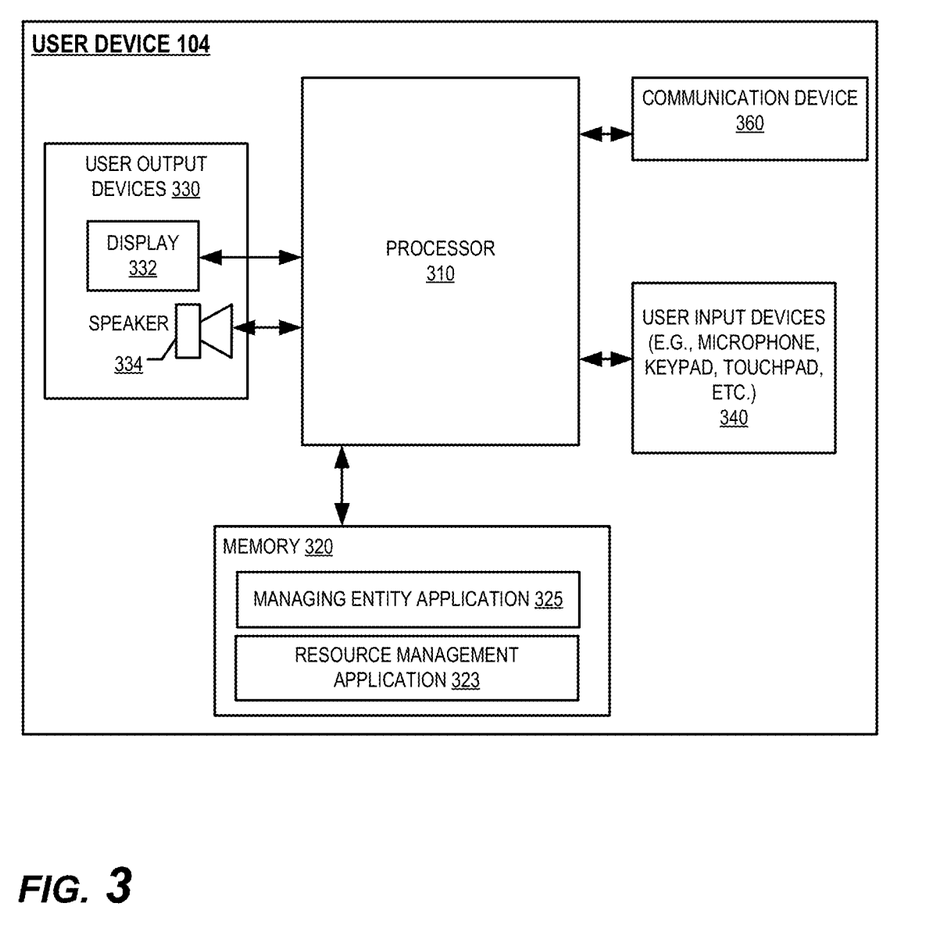
FIG. 3 is a block diagram illustrating a user device associated with the remote consensus, in accordance with one embodiment of the present disclosure.

FIG. 3 illustrates a block diagram of one of the one or more user devices associated with the resource tracking system, in accordance with embodiments of the present invention. The user device 104 may include a user mobile device or the like. A "mobile device" 104 may be any mobile communication device, such as a cellular telecommunications device (i.e., a cell phone or mobile phone), personal digital assistant (PDA), a mobile Internet accessing device, or another mobile device including, but not limited to portable digital assistants (PDAs), pagers, mobile televisions, entertainment devices, laptop computers, cameras, video recorders, audio/video player, radio, GPS devices, any combination of the aforementioned devices.

The user device 104 may generally include a processing device or processor 310 communicably coupled to devices such as, a memory device 350, user output devices 340 (for example, a user display or a speaker), user input devices 330 (such as a microphone, keypad, touchpad, touch screen, and the like), a communication device or network interface device 360, a positioning system device 320, such as a geo-positioning system device like a GPS device, an accelerometer, and the like, one or more chips, and the like.

The processor 310 may include functionality to operate one or more software programs or applications, which may be stored in the memory device 320. For example, the processor 310 may be capable of operating applications such as a resource management application 323, a managing entity application 325, or a web browser application. The resource management application 323 may allow the user device 104 to transmit and receive data and instructions to or from the resource tracking system 200 and/or another user device 104. The managing entity application 325 may allow the user device 104 to transmit and receive data to or from the managing entity system 300 (for example, via wireless communication or NFC channels). The resource management application 323 may be fully integrated within the managing entity application 325 and may allow a user 102 to view a resource repository associated with the user and/or view one or more resource repositories associated with other users. The user may be able to view any information associated with a resource in a resource repository, including predicted values associated with said resources and any distribution rules associated with said resources. The resource management application may also allow a user 102 to view pending resource transfers, approve or deny said transfers, and/or access other information relating to the features and functions of the resource tracking system 200.

The processor 310 may be configured to use the communication device 360 to communicate with one or more devices on a network 101 such as, but not limited to the resource tracking system 200, the managing entity system 300, and other user devices 104. In this regard the processor 310 may be configured to provide signals to and receive signals from the communication device 360. The signals may include signaling information in accordance with the air interface standard of the applicable BLE standard, cellular system of the wireless telephone network and the like, that may be part of the network 101. In this regard, the user device 104 may be configured to operate with one or more air interface standards, communication protocols, modulation types, and access types. By way of illustration, the user device 104 may be configured to operate in accordance with any of a number of first, second, third, and/or fourth-generation communication protocols and/or the like. For example, the mobile device 104 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, and/or the like. The user device 104 may also be configured to operate in accordance with non-cellular communication mechanisms, such as via a wireless local area network (WLAN) or other communication/data networks. The user device 104 may also be configured to operate in accordance Bluetooth® low energy, audio frequency, ultrasound frequency, or other communication/data networks.

The communication device 360 may also include a user activity interface presented in user output devices 330 in order to allow a user 102 to execute some or all of the processes described herein. The application interface may have the ability to connect to and communicate with an external data storage on a separate system within the network 101. The user output devices 330 may include a display 332 (e.g., a liquid crystal display (LCD) or the like) and a speaker 334 or other audio device, which are operatively coupled to the processor 310. The user input devices 340, which may allow the user device 104 to receive data from a user 102, may include any of a number of devices allowing the user device 104 to receive data, such as a keypad, keyboard, touch-screen, touchpad, microphone, mouse, joystick, other pointer device, button, soft key, and/or other input device(s).

The user device 104 may also include a memory buffer, cache memory or temporary memory device 320 operatively coupled to the processor 310. As used herein, memory may include any computer readable medium configured to store data, code, or other information. The memory device 320 may include volatile memory, such as volatile Random Access Memory (RAM) including a cache area for the temporary storage of data. The memory device 320 may also include non-volatile memory, which can be embedded and/or may be removable. The non-volatile memory may additionally or alternatively include an electrically erasable programmable read-only memory (EEPROM), flash memory or the like.

In some instances, various features and functions of the invention are described herein with respect to a "system." In some instances, the system may refer to the resource tracking system 200 performing one or more steps described herein in conjunction with other devices and systems, either automatically based on executing computer readable instructions of the memory device 230, or in response to receiving control instructions from the managing entity system 300. In some instances, the system refers to the devices and systems on the operating environment 100 of FIG. 1. The features and functions of various embodiments of the invention are be described below in further detail. It is understood that the servers, systems, and devices described herein illustrate one embodiment of the invention. It is further understood that one or more of the servers, systems, and devices can be combined in other embodiments and still function in the same or similar way as the embodiments described herein.

FIG. 4 is a high-level process flow diagram illustrating a process using the resource tracking system, in accordance with one embodiment of the present disclosure. The process begins at block 500, wherein the resource tracking system 200 electronically receives, from a resource management application of a user device associated with a user 102, one or more digital resources. A digital resource may refer to any content that is stored digitally. This may include static resources such as photos, images, files containing text, spreadsheets, or dynamic resources such as videos, music, and/or the like. Examples of resources provided herein is exemplary and those of skill in the art will recognize a digital resource can be any content, in any format, that is stored digitally and provides value to an entity (or to a user or consumer).

Next, as shown in block 510, the process flow includes creating, via the resource management module, one or more non-fungible tokens (NFTs) associated with the one or more resources. An NFT is a unit of data used as a unique digital identifier stored on a digital ledger that certifies ownership and authenticity of a digital artifact. NFTs cannot be copied, substituted, or subdivided. They are typically stored using distributed ledger technology. As such, NFTs are stored in a distributed ledger—a database that is consensually shared and synchronized across multiple sites, institutions, or geographies, accessible by multiple people. Distributed ledgers use independent computers (referred to as nodes) to record, share and synchronize transactions in their respective electronic ledgers (instead of keeping data centralized as in a traditional ledger).

In some embodiments, NFTs are created when a distributed ledger (e.g., blockchain) string records of cryptographic hash, a set of characters that verifies a set of data to be unique, onto previous records therefore creating a chain of identifiable data artifacts. This cryptographic transaction process ensures the authentication of each digital file by providing a digital signature that is used to track NFT ownership. In some embodiments, NFTs are stored in "smart contracts," which are automatically executable code that run on top of the distributed ledger on which the NFT is recorded. In some embodiments, the smart contracts associated with the distributed ledger may be used to attribute ownership and certify authenticity for the resource.

Next, as shown in block 520, the process flow includes storing the one or more NFTs associated with the one or more resources on a distributed ledger. In some embodiments, the user 102 may be able to use a resource management application to access and view stored resources and associated information, including a set of distribution rules for the NFT associated with the resource and an expected value of the resource or the NFT associated with the resource.

As shown in block 530, the system may receive, via the resource management application, new or updated sets of distribution rules associated with each NFT, which are input by the user. Distribution rules may impose restrictions or limitations on the sale or transfer of an NFT associated with a resource, including but not limited to restrictions on the transfer amount (i.e. the transfer must be for at least a predetermined amount of resources in exchange for the NFT, the transfer must only occur when the value of the NFT has increased by predetermined value, or the like), restrictions on a third-party involved in the transfer (i.e. the third-party must be an individual and not an entity, the third-party must be located in a particular geographic region, or the like), restrictions on future use of the NFT (i.e. the NFT may not be resold, the NFT may only be resold at a particular value, the NFT may not be altered, or the like), and/or any other such restrictions. The distribution rules may also include an amount of the value of the NFT to be retained by the user upon future use of the NFT. For example, the distribution rules may require that the user receives a certain percentage of the value of the NFT for each transfer or sale made after an initial transfer.

In some embodiments, the set of distribution rules may also comprise a visibility setting for each NFT in order to allow the resource or NFT to be viewed by a user other than the original owner or creator. A visibility setting may determine a user that can view the resource or NFT (i.e. only the original creator, only a preselected group of users, any user with a resource management application 323 installed on a user device, etc.) and may also determine a type of information associated with the NFT which is able to be viewed (i.e. a creation date, a predicted value, a number of viewers, etc.). For example, a visibility setting may allow a resource or NFT to be viewed by any user with a resource management application installed on a user device, but may only allow the predicted value of said resource or NFT to be viewed by the original creator.

In some embodiments, the set of distribution rules may also comprise instructions for determining a value of the NFT. For example, the distribution rules may require the system to use a prediction engine to calculate an expected value of the NFT, as is discussed in greater detail with respect to block 540. Additionally or alternatively, the instructions may comprise a user-determined value of the NFT, or a user-determined base value. A user-determined base value may be the lowest value at which the NFT may be sold and may further comprise instructions to auction the NFT to a highest bidder.

In some embodiments, as shown in block 540, the system may use the prediction engine to continuously or regularly update an expected value of the resource or the NFT associated with the resource. The system may then display the expected value on the resource management application of the user device. In some embodiments, the distribution rules associated with the resource or NFT may be dependent on the value of the resource or NFT at a given time. As discussed in greater detail with respect to FIG. 2, the prediction engine may use a plurality of historical data received from user devices, managing entity systems, and/or other third-party systems to predict a resource or NFT value, and the predicted value may be based on patterns or trends identified by the combination of historical data and details of the particular resource or NFT, such as creation date, user/creator information, resource type, geographic data, and/or the like. For example, in some embodiments, the prediction engine may determine that a particular NFT closely resembles a set of ten other NFTs associated with the same user. The prediction engine may then, based on the transaction details associated with those ten NFTs, predict a value of the particular NFT if it were to be sold at a particular time.

The prediction engine may provide an expected value in real time, or may provide a plurality of expected values over a larger period of time (for example, an expected value in the present moment, an expected value after a year, and an expected value after five years). The prediction engine may continuously update said expected values in real time as historical data is gathered from the user devices, managing entity systems, and/or other third-party systems.

Figure 5:
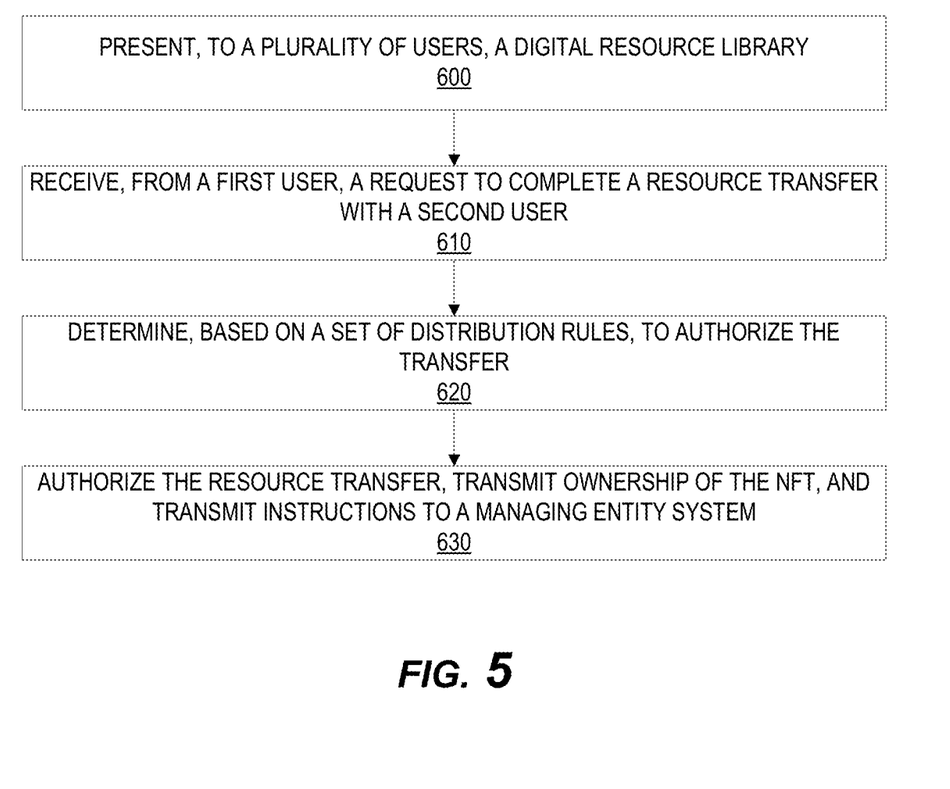
FIG. 5 is a flow diagram illustrating another process using the resource tracking system, in accordance with one embodiment of the present disclosure.

FIG. 5 is a high-level process flow diagram illustrating another process using the resource tracking system, in accordance with one embodiment of the present disclosure. The process begins at block 600, wherein the system presents, via the resource management applications of a plurality of user devices associated with a plurality of users, a digital "library" of resources, wherein each user of the plurality of users may view a personal resource repository as well as view any resources in another user's resource repository, in accordance with the visibility settings discussed in greater detail with respect to FIG. 4.

The process may then continue to block 610, wherein the resource tracking system 200 receives a request, from a user device associated with a first user of the plurality of users, to complete a resource transfer with a second user of the plurality of users, wherein the request for a resource transfer includes at least identification of an NFT to be transferred, and a payment amount of the transfer. In some embodiments, the first user may request to purchase the NFT from the second user. Additionally or alternatively, the first user may request to sell, gift, or otherwise transfer the NFT to the second user. The payment amount of the transfer may be the current predicted value of the resource or NFT, may be any amount set by the first user, or may comprise instructions to delay the resource transfer request until the predicted value of the NFT reaches a predetermined threshold value.

The process may then continue to block 620, wherein the resource tracking system 200 determines, based on the set of distribution rules associated with the NFT, whether to authorize the pending resource transfer. For example, if the distribution rules indicate that the NFT may not be "resold" or involved in multiple transactions, the resource tracking system may confirm that the NFT has never been involved in a previous transaction before authorizing the resource transfer. In another example, if the distribution rules indicate that the NFT may only be transferred to a user from a pre-approved list of users, the resource tracking system may verify that the recipient user is one of the pre-approved users before authorizing the resource transfer. Additionally or alternatively, the resource tracking system may determine, when the NFT has been involved in previous transfers, that a third user (i.e. an original owner or creator of the resource) is not one of the two users involved in the pending transfer, but that the distribution rules of the NFT require that the third user receives a percentage of the pending transfer.

In some embodiments, the process may then be completed in block 630, wherein the resource tracking system 200 authorizes the resource transfer, transfers ownership of the resource to the second user, and transmits instructions to a managing entity system to transfer, from an account associated with the first user, an amount of financial resources to an account associated with the second user and/or an account associated with any other third user(s) identified by the resource tracking system. For example, if the resource tracking system determines in block 620 that an original creator of the resource (i.e. a third user) will receive 10% of each subsequent sale of the NFT, the system may instruct the managing entity system to transfer 90% of the value of the NFT to the second user and 10% of the value to the original creator.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for resource origination tracking, the system comprising:
    at least one processing device; and
    at least one non-transitory storage device with computer-readable program code stored thereon and accessible by the at least one processing device, wherein the computer-readable code when executed is configured to cause the at least one processing device to:
        create a non-fungible token (NFT) associated with a digital resource, where the digital resource comprises an associated set of distribution rules;

determine, via a machine learning engine, a value of the NFT, wherein the value of the NFT comprises applying one or more machine learning algorithms to a plurality of historical data and calculating a level of similarity between the NFT and a plurality of other NFTs comprised in the historical data;

electronically receive a request to complete a resource transfer, wherein the request comprises an identification of the digital resource and an identification of a current at least one owner of the NFT;

transfer ownership of the NFT from the current at least one owner to at least one new second owner; and transmit, to a managing entity system, instructions to transfer, from an account associated with the new at least one owner, a first amount of financial resources to an account associated with the current at least one owner and a second amount of financial resources to an account associated with a user associated with the current at least one owner.

2. The system of claim 1, wherein the non-transitory computer-readable medium further comprises code configured to cause the at least one processing device to store the NFT on a distributed ledger.

3. The system of claim 1, wherein the set of distribution rules comprises a predetermined percentage of the value of the NFT, and wherein the second amount of financial resources transferred to the account associated with the user associated with the current at least one owner comprises the predetermined percentage of the value of the NFT.

4. The system of claim 1, wherein the set of distribution rules comprises a transfer limitation of a number of times that ownership of the NFT may be transferred to a new owner.

5. The system of claim 4, wherein the non-transitory computer-readable medium further comprises code configured to cause the at least one processing device to determine that the resource transfer will not cause the number of transfers of ownership of the NFT to exceed the transfer limitation.

6. The system of claim 1, wherein the combination of the first amount and the second amount is equal to the value of the NFT.

7. A computer program product for resource origination, the computer program product comprising at least one non-transitory computer-readable medium having computer-readable program code portions embodied therein, the computer-readable program code portions comprising:

an executable portion configured to create a non-fungible token (NFT) associated with a digital resource, where the digital resource comprises an associated set of distribution rules;

an executable portion configured to determine, via a machine learning engine, a value of the NFT, wherein the value of the NFT comprises applying one or more machine learning algorithms to a plurality of historical data and calculating a level of similarity between the NFT and a plurality of other NFTs comprised in the historical data;

an executable portion configured to electronically receive a request to complete a resource transfer, wherein the request comprises an identification of the digital resource and an identification of a current at least one owner of the NFT;

an executable portion configured to transfer ownership of the NFT from the current at least one owner to at least one new second owner; and an executable portion configured to transmit, to a managing entity system, instructions to transfer, from an account associated with the new at least one owner, a first amount of financial resources to an account associated with the current at least one owner and a second amount of financial resources to an account associated with a user associated with the current at least one owner.

8. The computer program product of claim 7, further comprising an executable portion configured to store the NFT on a distributed ledger.

9. The computer program product of claim 7, wherein the set of distribution rules comprises a predetermined percentage of the value of the NFT, and wherein the second amount of financial resources transferred to the account associated with the user associated with the current at least one owner comprises the predetermined percentage of the value of the NFT.

10. The computer program product of claim 7, wherein the set of distribution rules comprises a transfer limitation of a number of times that ownership of the NFT may be transferred to a new owner.

11. The computer program product of claim 10, further comprising an executable portion configured to determine that the resource transfer will not cause the number of transfers of ownership of the NFT to exceed the transfer limitation.

12. The computer program product of claim 7, wherein the combination of the first amount and the second amount is equal to the value of the NFT.

13. A computer-implemented method for resource origination tracking, the method comprising:

creating a non-fungible token (NFT) associated with a digital resource, where the digital resource comprises an associated set of distribution rules;

determine, via a machine learning engine, a value of the NFT, wherein the value of the NFT comprises applying one or more machine learning algorithms to a plurality of historical data and calculating a level of similarity between the NFT and a plurality of other NFTs comprised in the historical data;

electronically receive a request to complete a resource transfer, wherein the request comprises an identification of the digital resource and an identification of a current at least one owner of the NFT;

transfer ownership of the NFT from the current at least one owner to at least one new second owner; and transmit, to a managing entity system, instructions to transfer, from an account associated with the new at least one owner, a first amount of financial resources to an account associated with the current at least one owner and a second amount of financial resources to an account associated with a user associated with the current at least one owner.

14. The computer-implemented method of claim 13, further comprising storing the NFT on a distributed ledger.

15. The computer-implemented method of claim 13, wherein the set of distribution rules comprises a predetermined percentage of the value of the NFT, and wherein the second amount of financial resources transferred to the account associated with the user associated with the current at least one owner comprises the predetermined percentage of the value of the NFT.

16. The computer-implemented method of claim 13, wherein the set of distribution rules comprises a transfer limitation of a number of times that ownership of the NFT may be transferred to a new owner.

17. The computer-implemented method of claim 16, further comprising determining that the resource transfer will not cause the number of transfers of ownership of the NFT to exceed the transfer limitation.

18. The computer-implemented method of claim 13, wherein the combination of the first amount and the second amount is equal to the value of the NFT.

* * * * *